United States Patent [19]

Closse et al.

[11] 3,764,671

[45] Oct. 9, 1973

[54] ANTIBIOTIC SL 3440

[75] Inventors: Annemarie Closse, Binningen; Hans Hermann Thiele, Basel, both of Switzerland

[73] Assignee: Sandoz Ltd., Basel, Switzerland

[22] Filed: Oct. 28, 1971

[21] Appl. No.: 193,525

Related U.S. Application Data

[63] Continuation-in-part of Ser. No. 18,534, March 11, 1970, abandoned

[30] Foreign Application Priority Data

Mar. 18, 1969 Switzerland.......................... 4019/69

[52] U.S. Cl.................................... 424/122, 195/81
[51] Int. Cl............................................... A61k 21/00
[58] Field of Search...................................... 424/122

[56] References Cited
UNITED STATES PATENTS 3,465,079  9/1969  Sigg et al. ........................... 424/122

3,513,232  5/1970  Sigg et al. ........................... 424/122

Primary Examiner—Jerome D. Goldberg
Attorney—Gerald D. Sharkin et al.

[57] ABSTRACT

The invention concerns a new antibiotic SL 3440 having the following characteristics: a colourless, viscous oil having the empirical formula $C_{28}H_{38}N_4O_6$, a specific rotation of $[\alpha]_D^{20} = -127.7°$ ($c = 1.0$ in benzene) and showing characteristic ultraviolet and infrared spectrums.

The antibiotic possesses a fungistatic effect and furthermore exhibits a cytostatic effect on Walker tumors in rats.

4 Claims, 2 Drawing Figures

APPLICANTS
Annemarie Closse
Hans Hermann Thiele

By *Gerald D. Sharkin*
ATTORNEY

ANTIBIOTIC SL 3440

This is a continuation in part of copending application Ser. No. 18,534 filed on Mar. 11, 1970 now abandoned, the invention relating to a new antibiotic, hereinafter referred to as SL 3440.

Figure 1:
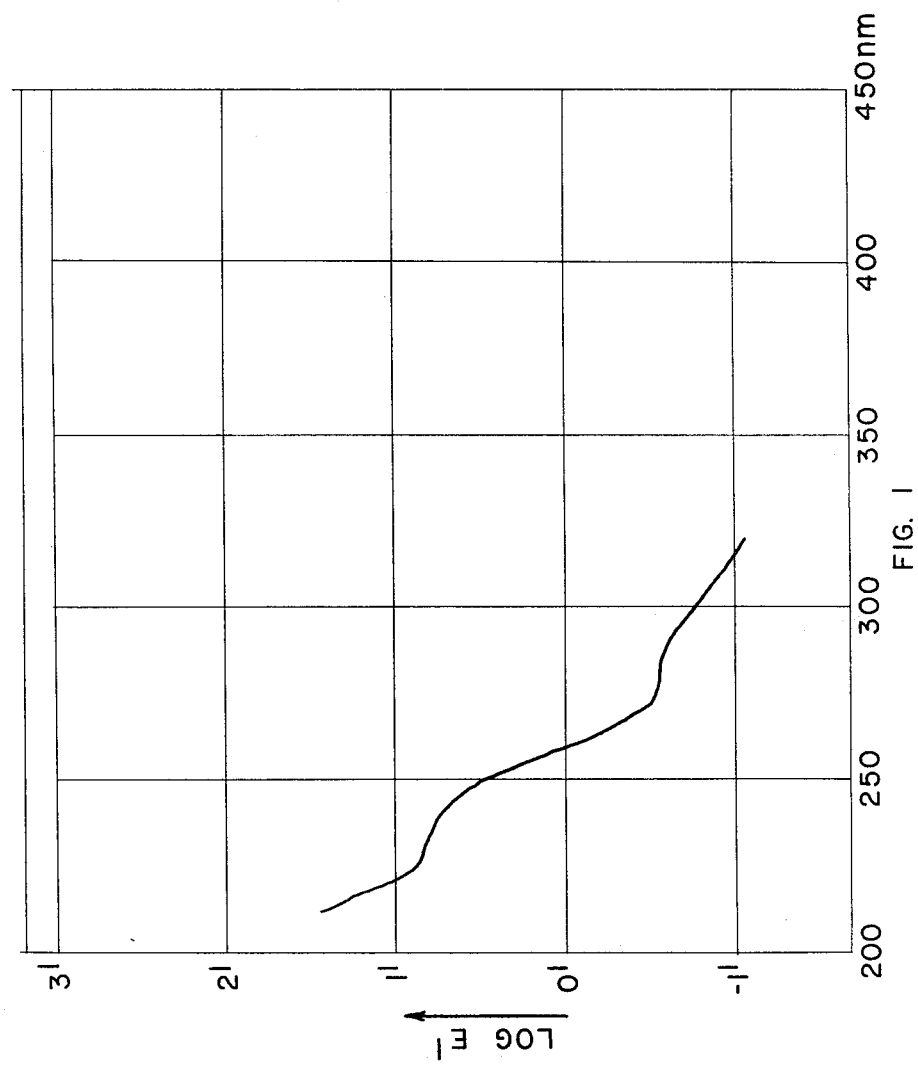
Figure 2:
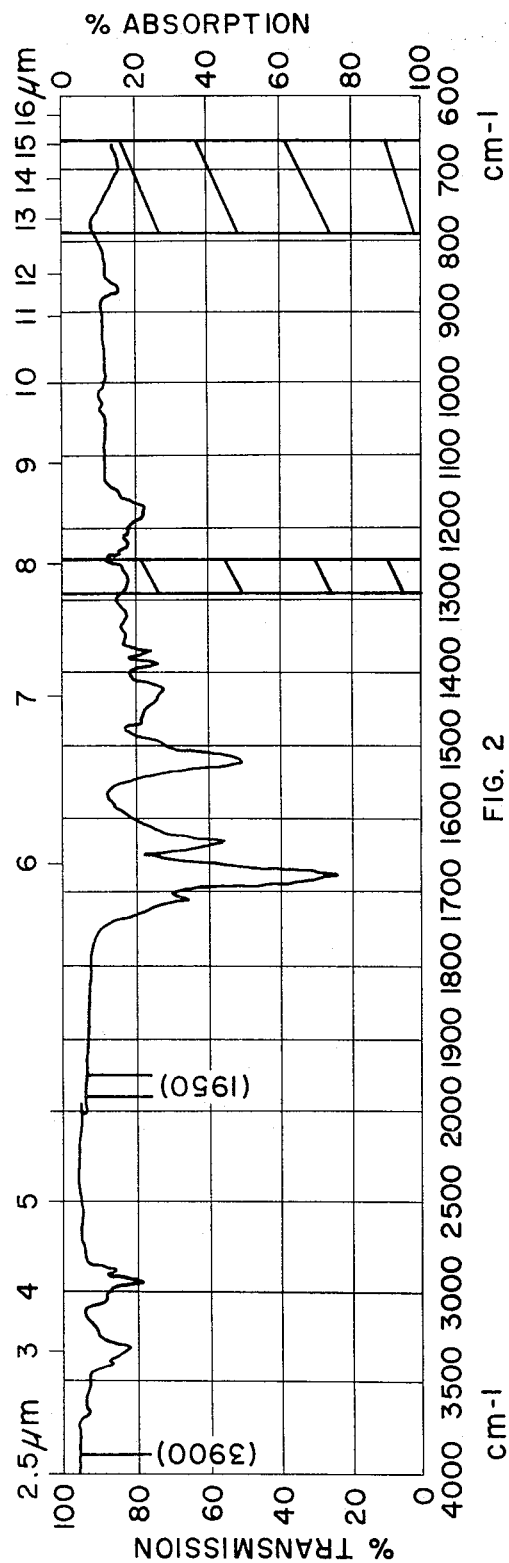

The present invention provides the new antibiotic SL 3440 having the following characteristics: a colourless, viscous oil having the empirical formula $C_{28}H_{38}N_4O_6$, and a specific rotation of $[\alpha]_D^{20} = -127.7°$ ($c = 1.0$ in benzene) and showing the ultraviolet spectrum (in methanol) and the infrared spectrum (in methylene chloride) of FIGS. 1 and 2, respectively.

According to another aspect of the present invention a process for the production of the new antibiotic SL 3440 is characterized in that the strain NRRL 3472 of the fungus species Diheterospora chlamydosporia is cultivated in contact with a nutrient medium, and the resulting antibiotic is isolated from the fermentation liquor and purified by methods known per se.

The new strain NRRL 3472 of Diheterospora chlamydosporia employed in the process was isolated from a soil sample found in Italy, and a specimen of the strain has been deposited with the United States Department of Agriculture (Northern Utilization Research and Development Division), Peoria, Ill., U.S.A., under the reference NRRL 3472.

The new strain NRRL 3472 of the fungus species Diheterospora chlamydosporia grows on a glucose/malt extract/yeast extract/peptone agar at 18° to 27°C and forms a white, low aerial mycelium. The under side of the colony shows a yellow-brown colouration of the substrate.

Morphologically and physiologically the new strain NRRL 3472 corresponds to the description of the fungus species Diheterospora chlamydosporia by G. L. Barron and A.H.S. Onions, Canadian Journal of Botany, Volume 44, pages 861 to 869 (1966).

The new strain NRRL 3472 of the fungus species Diheterospora chlamydosporia may be cultivated on various nutrient media containing the usual nutrients to provide the new antibiotic. For example nutrients usually employed for carbon-heterotrophic organisms may be used. For example glucose, starch, dextrin, lactose or cane sugar may be used as the carbon source, organic and inorganic nitrogen-containing compounds, such as peptone, yeast or meat extracts, ammonium sulphate, ammonium nitrate or amino acids may be used as the nitrogen source, as well as the usual mineral salts and trace elements.

One method of producing the antibiotic SL 3440 comprises inoculating a liquid nutrient medium with a suspension of spores of the new strain of Diheterospora chlamydosporia and incubating the culture at 18°C for 8 days. The cultivation may be effected under aerobic conditions by static surface culture fermentation or by submerged culture fermentation with shaking, or in fermenters provided with devices for introducing air or oxygen and agitators. As soon as the maximum amount of antibiotic has been produced, the culture solution is filtered and the antibiotic is obtained from the mycelium-free culture solution in a manner known per se, by extraction or adsorption.

One convenient method of isolating the antibiotic of the present invention comprises extraction of the mycelium-free culture solution with ethylene chloride, although other organic solvents, e.g. benzene, chloroform, butyl acetate, methylene chloride or butanol, may likewise be used. The new antibiotic may be isolated from the crude extract by chromatography.

The new antibiotic SL 3440 may be characterized as follows:

Infrared spectrum (methylene chloride):
inter alia bands at 1685 and 1635 cm$^{-1}$ (FIG. 2).
Empirical formula $C_{28}H_{38}N_4O_6$
Elemental analysis:
found: C = 64.3 percent; H = 7.7 percent; N = 10.3 percent; O = 18.1 percent
calculated: C = 63.9 percent; H = 7.3 percent; N = 10.6 percent; O = 18.2 percent
Specific rotation $[\alpha]_D^{20} = -127.7°$ ($c = 1.0$ in benzene)

The new antibiotic is characterized by interesting pharmacological properties and is therefore indicated for use as a medicament.

The new antibiotic is a useful fungistatic as indicated by a high fungistatic effect against various organisms causing fungus infections. It has a particularly good activity in vitro against Trichophyton mentagrophytes (lowest inhibiting concentration 10γ/ml)

Histoplasma capsulatum (lowest inhibiting concentration 10γ/ml)

Trichophyton tonsurans (lowest inhibiting concentration 10γ/ml)

Trichophyton rubrum (lowest inhibiting concentration 10γ/ml)

Epidermophyton floccosum (lowest inhibiting concentration 10γ/ml)

Microsporum canis (lowest inhibiting concentration 10γ/ml)

Microsporum audouinii (lowest inhibiting concentration 10γ/ml)

Histoplasma duboisii (lowest inhibiting concentration 10γ/ml)

Blastomyces brasiliensis (lowest inhibiting concentration 10γ/ml)

Blastomyces dermatitidis (lowest inhibiting concentration 1γ/ml)

Sporotrichum schenkii (lowest inhibiting concentration 100γ/ml).

The new antibiotic is furthermore a cytostatic agent as indicated by a cytostatic effect exhibited in vitro on a cell strain derived from a mouse tumour (mastocytoma P-815) as well as in vivo in rats on the Walker tumour. The new antibiotic, at a concentration of 0.0004γ/ml, shows a 50 percent inhibition of mastocytoma P-815 cell increase in vitro. A suitable dose in inhibiting Walker tumours in vivo in rats is between 30 and 120 mg/kg body weight of test animal, the dose being dependent on the extent of the effect required and the mode of administration.

In general, dependent on the nature of the treatment desired, a suitable single dose is between 20 and 1,000 mg, preferably administered twice a week, and a suitable preparation for oral administration conveniently contains between 20 and 1,000 mg of the active agent, mixed with a pharmaceutically acceptable liquid or solid carrier.

Powders, sprays, ointments or tinctures, containing 0.1 to 2 percent by weight of the active agent, may be employed for topical application in the treatment of fungus diseases occurring in warm-blooded animals.

In the following Example, which illustrates the process without in any way limiting the scope of the invention, all temperatures are indicated in degrees Centigrade.

EXAMPLE:

10 litres of a nutrient solution (of which each litre contains
- 40 g of Cerelose
- 5 g of tryptone
- 3 g of NaNO$_3$
- 1 g of K$_2$HPO$_4$
- 500 mg of KCl
- 500 mg of MgSO$_4 \cdot$ 7 H$_2$O
- 10 mg of FeSO$_4 \cdot$ 7 H$_2$O and demineralized water to make up 1 litre) are inoculated in a fermenter with a suspension of spores of the strain NRRL 3472 of Diheterospora chlamydosporia, and incubation is effected at 18° for 8 days whilst aerating (1.0 litre of air per minute per litre of nutrient solution) and stirring (300 revolutions per minute). The mycelium is separated and the culture filtrate is extracted with ethylene chloride. The crude extract is chromatographed on silica gel Merck (0.05 – 0.2 mm) and the active material is eluted with chloroform/methanol (99:1).

The suspension of spores employed for inoculation is produced from a culture of the originally isolated strain, which is cultivated at 27° for 8 days on an agar medium having the following composition:
- 20 g of Cerelose
- 20 g of filamentous agar
- 2 g of malt extract (Schweiz. Ferment AG)
- 2 g of yeast extract
- 2 g of peptone
- 2 g of KH$_2$PO$_4$
- 2 g of MgSO$_4 \cdot$ 7 H$_2$O and demineralized water to make up 1 litre.

What is claimed is:

1. The antibiotic SL 3440 having the empirical formula C$_{28}$H$_{38}$N$_4$O$_6$, a specific rotation of $[\alpha]_D^{20} = -127.7°$ ($c = 1.0$ in benzene) and showing the ultraviolet spectrum (in methanol) of FIG. 1 and the infrared spectrum (in methylene chloride) of FIG. 2.

2. A process for the production of the antibiotic SL 3440 having the empirical formula C$_{28}$H$_{38}$N$_4$O$_6$, a specific rotation of $[\alpha]_D^{20} = -127.7°$ ($c = 1.0$ in benzene) and showing the ultraviolet spectrum (in methanol) of FIG. 1 and the infrared spectrum (in methylene chloride) of FIG. 2, which comprises cultivating Diheterospora chlamydosporia NRRL 3472 in contact with a nutrient medium until the antibiotic SL 3440 has been produced, and isolating the resulting antibiotic SL 3440 from the fermentation liquor.

3. A pharmaceutical composition comprising 20 to 1,000 mg of the antibiotic of claim 1, in association with a pharmaceutically acceptable carrier.

4. A pharmaceutical composition comprising 0.1 to 2 percent by weight of the antibiotic of claim 1, in association with a carrier suitable for topical application.

* * * * *